(12) United States Patent
Farrugia et al.

(10) Patent No.: US 7,191,234 B2
(45) Date of Patent: Mar. 13, 2007

(54) DEPLOYMENT OF SMART CARD BASED APPLICATIONS VIA MOBILE TERMINALS

(75) Inventors: Augustin J. Farrugia, Los Altos, CA (US); Frederic C. Laporte, Marseille (FR)

(73) Assignee: Gemplus, Gemenos (FR)

( * ) Notice: Subject to any disclaimer, the term of this patent is extended or adjusted under 35 U.S.C. 154(b) by 563 days.

(21) Appl. No.: 09/975,994

(22) Filed: Oct. 15, 2001

(65) Prior Publication Data
US 2002/0100798 A1 Aug. 1, 2002

Related U.S. Application Data

(60) Provisional application No. 60/239,890, filed on Oct. 13, 2000.

(51) Int. Cl.
*G06F 15/16* (2006.01)
(52) U.S. Cl. ...................... 709/227; 709/217
(58) Field of Classification Search ........ 709/200–203, 709/217–220, 227; 235/379–380; 455/426.1, 455/557–558
See application file for complete search history.

(56) References Cited

U.S. PATENT DOCUMENTS

| | | | |
|---|---|---|---|
| 6,223,290 B1 * | 4/2001 | Larsen et al. | 713/201 |
| 6,359,699 B1 * | 3/2002 | Yoneta et al. | 358/1.16 |
| 6,374,275 B2 * | 4/2002 | Wasilewski | 715/530 |
| 6,434,405 B1 * | 8/2002 | Sashihara | 455/557 |
| 6,442,532 B1 * | 8/2002 | Kawan | 705/35 |
| 6,577,229 B1 * | 6/2003 | Bonneau et al. | 340/10.41 |
| 6,609,655 B1 * | 8/2003 | Harrell | 235/380 |
| 6,738,901 B1 * | 5/2004 | Boyles et al. | 713/159 |
| 6,741,872 B1 * | 5/2004 | Pinault | 455/564 |
| 6,779,115 B1 * | 8/2004 | Naim | 713/192 |
| 6,796,490 B1 * | 9/2004 | Drummond et al. | 235/379 |

FOREIGN PATENT DOCUMENTS

| | | |
|---|---|---|
| EP | 0 869 691 A2 | 10/1998 |
| EP | 1 063 858 A1 | 12/2000 |
| GB | 2 348 083 | 9/2000 |
| WO | 97/44762 | 11/1997 |

* cited by examiner

*Primary Examiner*—Moustafa M. Meky
(74) *Attorney, Agent, or Firm*—Buchanan Ingersoll & Rooney PC

(57) ABSTRACT

The ability to utilize smart card based Internet applications is facilitated by enhancing the functionality of smart cards dedicated to other applications, to enable them to connect to and interoperate with Internet application servers. The functionality of subscriber identification module (SIM) card is enhanced to incorporate the information necessary to interact with an Internet-based application service provider. The user can also employ a conventional smart card to access an Internet application from a personal computer or other terminal equipped with a conventional smart card reader, and use the SIM card to interact with application when access to a conventional smart card reader is not available. The application server recognizes the distinction between access with the two different types of cards, and ensures that both cards are synchronized with one another.

33 Claims, 4 Drawing Sheets

DEPLOYMENT OF SMART CARD BASED APPLICATIONS VIA MOBILE TERMINALS

This disclosure claims priority from provisional U.S. Application No. 60/239,890, filed Oct. 13, 2000, the contents of which are incorporated herein by reference.

FIELD OF THE INVENTION

The present invention is generally directed to computer software applications that employ the features of smart cards, and more particularly to the deployment of Internet applications in environments where conventional smart card readers are not available.

BACKGROUND OF THE INVENTION

A variety of different applications have been developed which take advantage of the security and portability offered by smart cards. Examples of such include banking applications, electronic purses, loyalty programs and medical records storage. Whenever a smart card is to be employed for one of these applications, it must be inserted, or otherwise communicate with, a reader to which the application has access. Depending upon the applications, the readers can take a variety of different forms. For example, in banking applications, the reader might be present in an automated teller machine, whereas electronic purse applications might utilize readers within vending machines and at other points of sale. The deployment of readers represents one of the more demanding tasks associated with the utilization of smart cards in an application. Often, successful deployment of a sufficient number of readers to support the application requires significant commercial and marketing efforts.

Recently, a number of Internet-accessible applications have been developed that are capable of utilizing the features provided by smart cards. One example of such is a portal application that provides an owner of a smart card with personalized access to the Internet using single sign-on security and password data that is stored in the smart card, and therefore extremely portable. A limitation associated with these applications, however, is the fact that the user must have access to a reader in order to utilize them. While there exist ongoing efforts to equip computer terminals with readers, for example by incorporating them within the structure of keyboards, the dissemination of these readers is not sufficiently widespread to enable users to take serious advantage of the portability offered by the smart card. Even if the user has installed a smart card reader on his personal computer at home and/or at work, he is not able to access the smart card based Internet application from terminals at other locations.

To provide some degree of mobility, it is possible to equip a portable laptop or notebook computer with a smart card reader. For example, such a reader might be embodied within a PCMCIA card that is inserted in a slot of the portable computer. While this feature offers the ability to access the Internet application from a site other than the home or office computer, it still requires the user to have the portable computer in his possession, which is not always desirable or feasible. In addition, access to the Internet via a portable computer often takes place via a dial-up modem. For some Internet applications, the limited data transfer speeds associated with this type of access may restrict the user experience to the point where utilization of the application from a portable computer is not acceptable.

It is an objective of the present invention, therefore, to provide a mechanism that enables smart card based Internet applications to be deployed on a relatively widespread basis without requiring a large number of smart card readers to be installed at all the various locations from which a user might desire to access the applications.

SUMMARY OF THE INVENTION

In accordance with the present invention, the ability to utilize smart card based Internet applications is facilitated by enhancing the functionality of smart cards dedicated to other applications, to enable them to connect to and interoperate with Internet application servers. One example of these dedicated smart cards comprises the subscriber identification module (SIM) card that is commonly found in certain types of mobile telephones. In essence, the SIM card comprises a specialized smart card that is removably housed within a mobile telephone and securely stores information such as a subscriber's identification number, security information and a personal directory of numbers. The SIM card enables the subscriber to send and receive telephone calls from any device that supports the card, such as a mobile telephone that complies with the standards established by the Global System for Mobile Communications (GSM).

Typically, the SIM card contains data that is dedicated to telephony applications. In accordance with the present invention, however, the functionality of the card is enhanced to incorporate the information necessary to interact with an Internet-based application service provider (ASP). This information includes the data and features associated with an application provided by the ASP, as well as additional information that enables the SIM card to establish communication with the ASP via the mobile telephone or other device within which it is located. For example, in the context of a GSM mobile telephone, the SIM card can employ the short message service (SMS) supported by the GSM standard, to communicate with the ASP.

In some implementations of the invention, the user may employ a conventional smart card to access an Internet application from his personal computer or other terminal equipped with a smart card reader, and use the SIM card to interact with application when he does not have access to a reader for the conventional smart card. As a further feature of the invention, the application server recognizes the distinction between access with the two different types of cards, and ensures that both cards are synchronized with one another. Thus, for example, if the information stored on a SIM card is updated during a particular session with the application, the updated information is stored in a synchronization server. The next time the user accesses the application with the conventional smart card, the stored information is downloaded to the card so that it contains the same information as the SIM card.

Further features of the invention, and the advantages offered thereby, are explained in detailed hereinafter with reference to exemplary embodiments of the invention.

DETAILED DESCRIPTION

To facilitate an understanding of the principles which form a basis for the present invention, they are described hereinafter with reference to a specific implementation of the invention. More particularly, reference is made to embodiments in which the invention is implemented in the context of a SIM card that is employed in mobile telephones. An understanding of the concepts which underly the invention will make it apparent, however, that these embodiments are not the only practical implementation of the invention. Rather, the principles of the invention are more broadly applicable of any type of smart card that is dedicated to one or more specific functions and that can be provided with the ability to connect to an application server within the context of those functions. The embodiments which are described hereinafter should therefore be viewed as exemplary.

Figure 1:
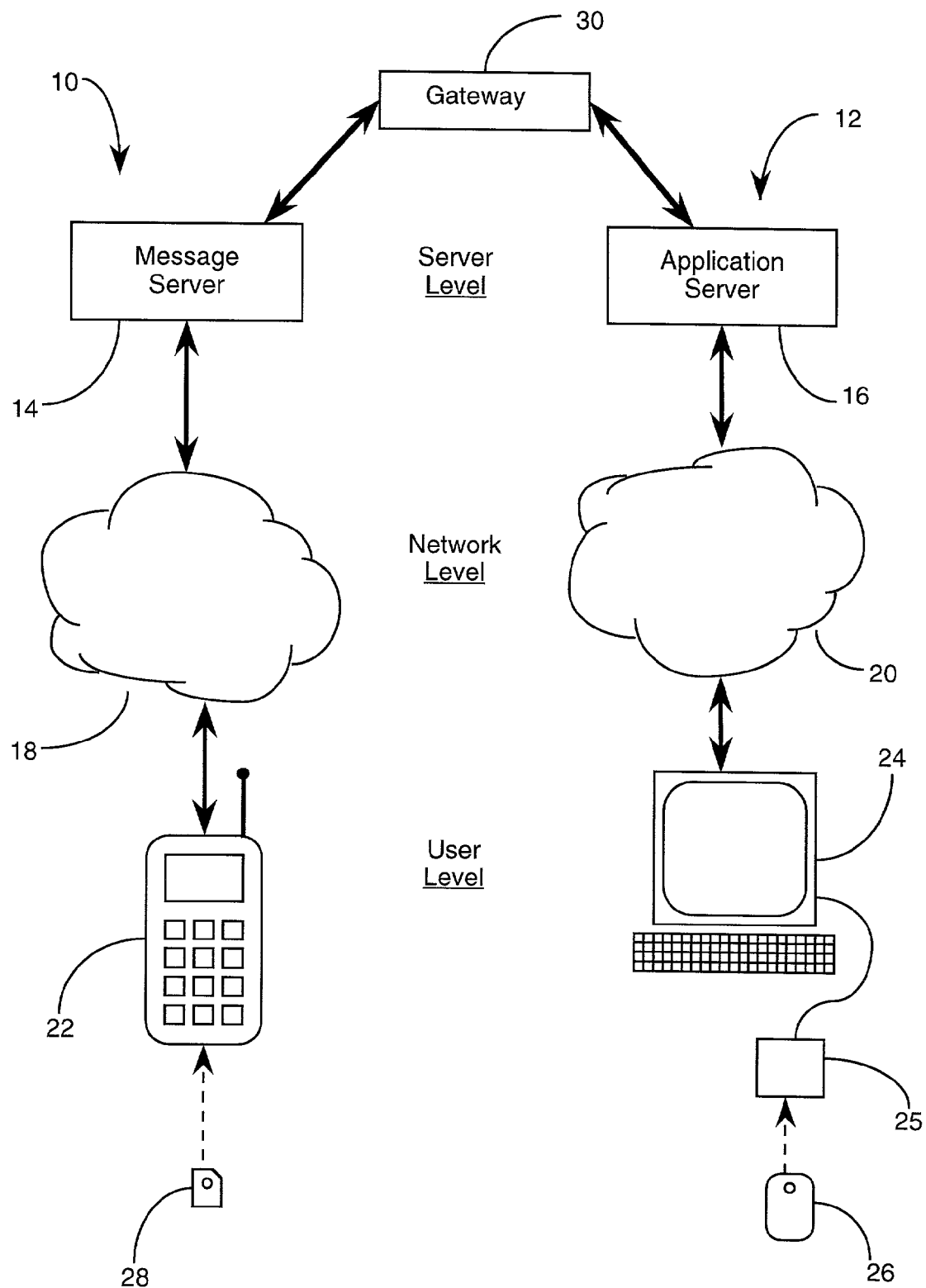
FIG. 1 is a block diagram of a data network and a telecommunications network, and the manner in which they are interconnected in accordance with the present invention.

FIG. 1 provides an overview of two different types of networks that may be utilized for different purposes. One network comprises a telecommunications network 10 via which a user can initiate and receive voice messages and, in many cases, data as well. The other network comprises a data network 12 by which the user interacts with applications to perform transactions, retrieve information, etc.

Each network consists of three main layers. One layer comprises one or more servers that provide the functionality associated with the network. In the case of the telecommunications network 10, the server 14 might be one which provides messages or other forms of data to the user. In the case of the data network 12, the server 16 executes an application being accessed by the user.

The second layer of each network comprises the medium by which the user connects to the server. For the telecommunications network 10, the network medium 18 might be a combination of land lines and wireless transceivers. For the data network 12, the medium 20 might be the Internet, for example.

The third layer of the network comprises the user layer, and consists of the device or devices by which the user connects to the network. In the case of the telecommunications network, such a user device 22 may be a wireless communications device such as a mobile telephone, for example. For the data network 12, the user device may be a personal computer 24 or a workstation that interacts with applications running on the server 16 by means of a browser and/or a client application.

One or more of the applications executing on the application server 16 can utilize the features of a smart card 26 to authenticate a user to the application. For example, a banking application may require the user to enter a password, and utilize this information together with other data securely stored in the memory of the smart card to confirm that the user is entitled to access the application. In another situation, a portal application may utilize information stored in the smart card's memory to determine the profile of the user and thereby present a display that is consistent with the user's interests. To utilize these applications, therefore, the user device 24 that is employed to access the application via the network 12 must be equipped with a smart card reader 25. Typically, the smart card 26 is of the type that conforms to the ISO specifications that establish standards for smart cards, and the reader operates in accordance with these standards. In the context of this disclosure, such a smart card is referred to as a "conventional" smart card and the reader is identified as a "conventional" reader. If such a reader is not connected to the user device 24, the user is unable to access the application, or at least that portion of its functionality that employs data within the smart card.

Some telecommunications networks 10 utilize a dedicated type of smart card, known as a subscriber identification module (SIM) card, in the devices 22 to authenticate the user to the network. One example of such a telecommunication network is the Global System for Mobile Communications (GSM). In the context of the present invention, the smart card 28 that is present within a device 22 can be employed to provide the user with access to applications executing on the server 16 in those situations where a smart card reader connected to the Internet 20 is not available.

To accomplish such a result, the user's SIM card is enhanced so that it supports not only the telephony functions conventionally associated with the telecommunications network 10, but also one or more desired applications executing on the server 16. For instance, the memory of the SIM card can have stored therein a client applet that interacts with the server 16 in a manner analogous to a client executing on the personal computer 24. Such an applet includes the appropriate set of commands, i.e. interface, and/or data for communicating with the application executing on the server 16.

The present invention also provides a mechanism for connecting the device 22 to the application server 16. As shown in FIG. 1, a gateway 30 connects the application server 16 to a server 14 in the telecommunications network. The server 14 transmits messages between the device 22 and entities external to the telecommunications network. An example of such a server is one which supports the short messaging service (SMS) associated with GSM-based telecommunications networks. In essence, the short message service enables messages of limited length, e.g. up to 160 characters, to be sent to and received from a device. This service enables commands to be transmitted to the device that are capable of being interpreted by a SIM card.

The gateway 30 functions to translate commands and responses received from the application server 16 into the appropriate format for transmission to the device 22 via the short message service. Similarly, it translates messages received from the device 22 via the service into the appropriate calls or responses for the application executing on the application server 16. Thus, the gateway 30 enables the application server 16 to establish a virtual link to the SIM card within the device 22, by means of the telecommunications network 10. As a result, a user having possession of an appropriate device 22 with a SIM card is able to access and interact with a smart card based Internet application, even in those situations where a conventional smart card reader is not available.

Figure 2:
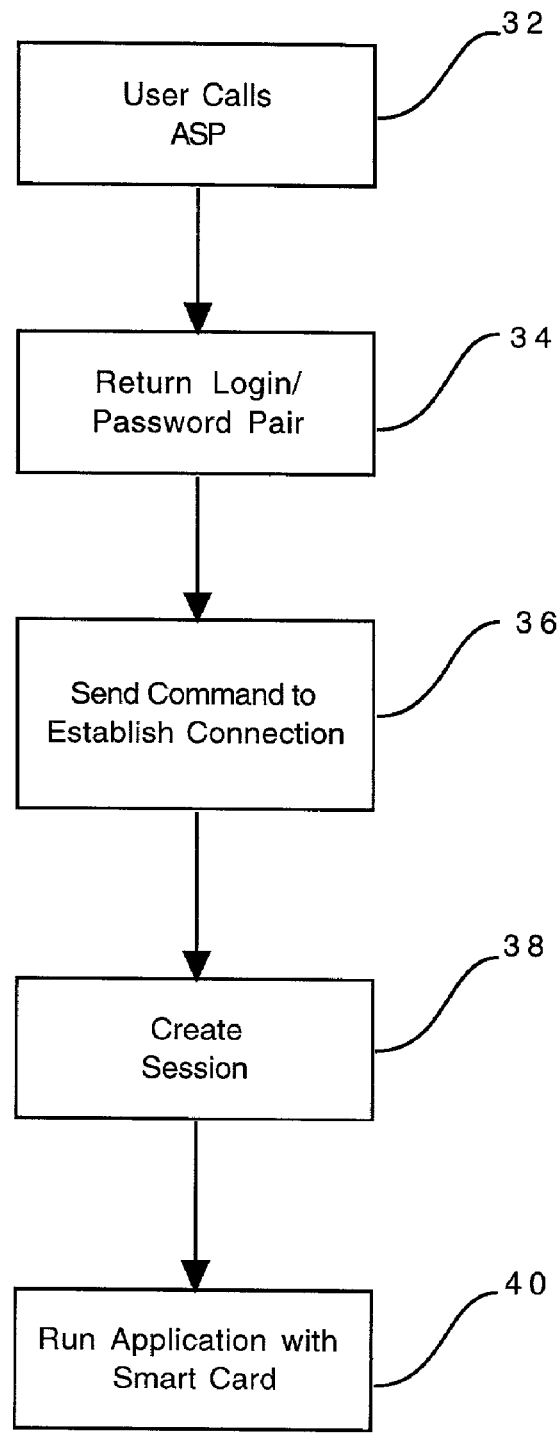
FIG. 2 is a flow chart illustrating the manner in which a user session is established with the telecommunications device.

FIG. 2 is a flow chart that illustrates the procedure for accessing a smart card based Internet application by means of a device 22, such as the mobile telephone of FIG. 1. As a first step 32, the user initiates a call to the application server 16. The call is handled by an automated call processing system, which determines the identification of the user, for example by means of information stored in the SIM card and/or the telephone number of the calling device 22. If the user is recognized, at step 34 the call processing system obtains a temporary login/password pair value from the application server 16, and returns it to the device 22, for example in the form of a short message. The login/password pair can be displayed to the user on an LCD screen of the device 22, or the like.

For security purposes, the login/password pair is valid for only a short period of time, e.g. 1 minute. Once that period of time elapses, the server 16 discards the values in the pair to thereby prevent their reuse. Hence, if the user is delayed after receiving the login/password pair before attempting to connect to the server, steps 32 and 34 need to be repeated.

Once the user obtains the login/password pair of values, they are employed to establish a connection to the server 16, via the gateway 30. To do so, at step 36 the user enters a command to connect to the server, which is transmitted by the device 22 in the form of a short message to the telecommunications server 14, which relays it to the gateway 30. The command includes the login and password values that were just received by the user, as well as any other information necessary to establish the connection, e.g. address information, protocol, connection speed, etc. Alternatively, an over-the-air (OTA) application can be stored on the SIM card to provide the connection information during the initial call to the server to obtain the login/password pair. By means of this approach, all the information necessary to establish a connection can be provided to the server ahead of time, so that when the request to establish the connection is received, the procedure for setting up the connection is minimized.

If the request to establish the connection is received in the period of time that the login and password values are valid, the server creates a process to run an Internet session at step 38. Thereafter, the user interacts with the application running on the application server 16, at step 40, in a manner analogous to operation with a conventional smart card. In this case, however, the interface to the application comprises the device 22, rather than a personal computer 24 or a workstation. Accordingly, the applet stored in the SIM card presents data to the user in a manner consistent with the limited display characteristics of the device. In this regard, by virtue of the procedure by which the Internet session is established, the server and the application are alerted to the fact that the user is interacting with the application by means of a SIM card, rather than a conventional ISO-compliant smart card. Consequently, the information returned by the application can be presented in a format that is appropriate to the interface provided by the device 22. For example, only text data may be provided, rather than a combination of text and graphics.

From the foregoing, it can be seen that the present invention provides a user with a mechanism for accessing Internet applications that utilize the features of smart cards, even when a conventional smart card reader is not available. As a result, application service providers are able to deploy their applications to a larger population than those having direct access to conventional smart card readers. Depending upon the nature of the device 22 that is employed, the user's ability to interact with the application may be limited. For example, the size of the display screen on a typical mobile telephone restricts the amount of information that can be presented to the user, particularly in contrast to a full-featured browser executing on a personal computer. Hence, it is most likely that, whenever possible, the user will desire to access the application by means of the personal computer 24, using a conventional, ISO-compliant smart card, and limit access via the device 22 to those situations where the appropriate reader is not available. As a result, two different cards may be employed, at different respective times, to interact with the application, namely the conventional ISO-compliant card and the SIM card in the device 22.

In such a situation, it is desirable to ensure that both of the cards contain the same information, particularly for those applications where data stored in the card may be modified during a session. For instance, if the Internet application pertains to an electronic purse, the monetary value stored in the card will be altered if the user employs the card to purchase services or merchandise. If the SIM card within the user device 22 is employed to conduct such a transaction, it is necessary to ensure that the monetary value stored in the electronic purse application of the ISO-compliant card is also adjusted by the appropriate amount.

Figure 3:
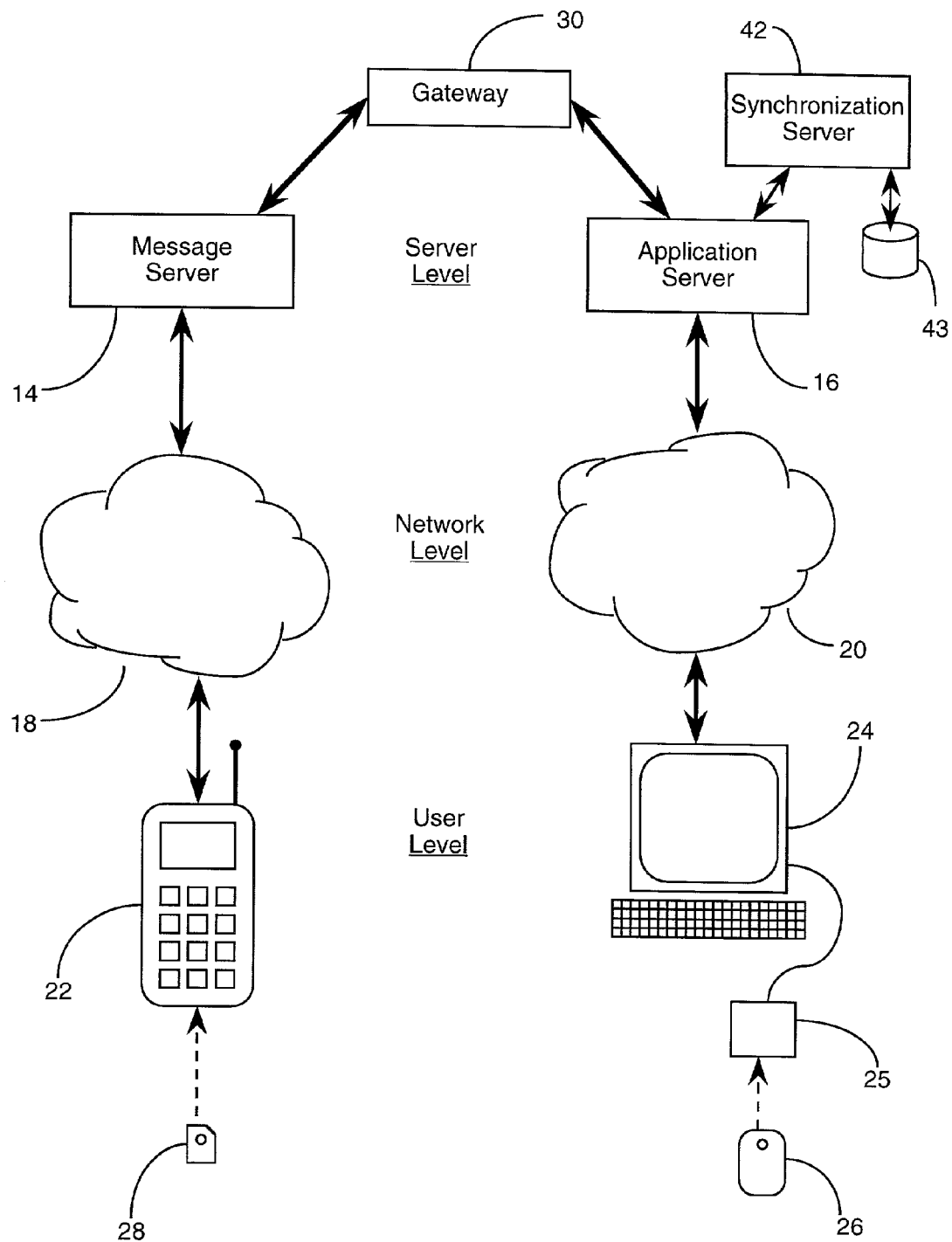
FIG. 3 is a block diagram of a further embodiment of the invention that provides synchronization among multiple cards.
Figure 4:
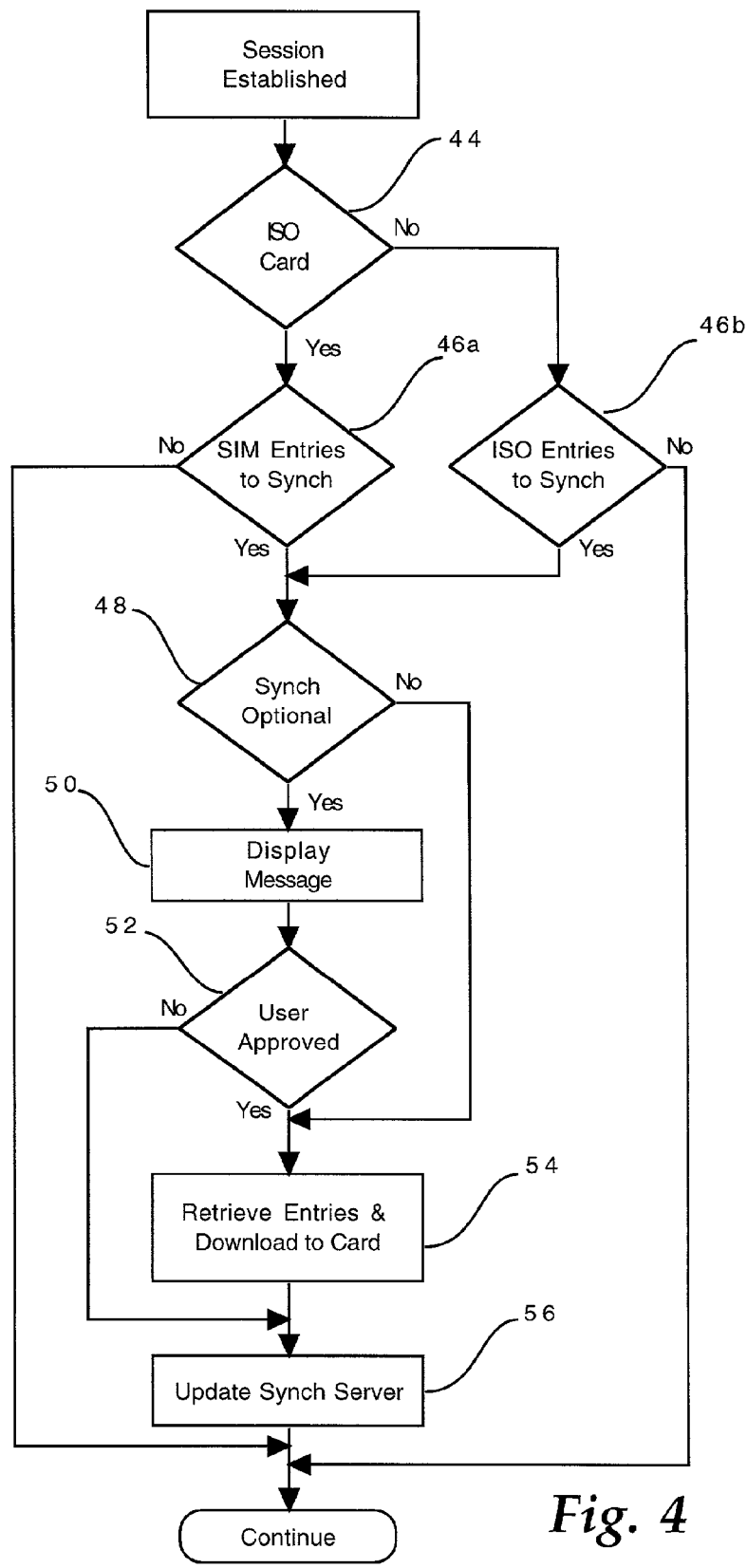
FIG. 4 is a flow chart of the synchronization process.

Referring to FIG. 3, a synchronization server 42 is associated with the application server 16. Whenever, as a result of interaction with an application, the data in one of the smart cards is modified, a corresponding entry is stored in a database 43 connected to the synchronization server. This entry can include an identification of the particular card on which the modification was made, i.e. the SIM card or the ISO-compliant card, along with the data field in which the modification occurred, and the prior and new values for the data. Referring to FIG. 4, each time that the user establishes a session with the application, it detects at step 44 whether the SIM card or the ISO-compliant card is being used for that session. The application then checks the synchronization server 42 at step 46*a* or 46*b*, as appropriate, to identify any entries indicating that data modifications were previously made on the other card.

Depending upon the nature of the data, the downloading of the modifications to the current card can be mandatory or optional. For example, in the case of an electronic purse it is necessary to ensure synchronization between the two cards, to prevent fraud. For personal types of data, however, such as user profiles or the like, absolute synchronization is not necessary. Therefore, if the application detects at step 46*a* or 46*b* that modifications have been made, it determines at step 48 whether the synchronization of the two cards is an optional feature. If so, a message is displayed to the user at step 50 indicating that updated data is available for the current card, and requests whether the user desires to have such data downloaded. If the user selects the download at step 52, the data is retrieved from the synchronization server 42 at step 54 and downloaded to the card. If the synchronization is not optional, as determined at step 48, the process of step 54 is carried out automatically. If the synchronization is optional, but the user elects not to synchronize at step 52, then step 54 is skipped. Thereafter, the synchronization server 42 is updated at step 56 to indicate whether the modified data has been downloaded or is not desired by the user, and the application continues.

While the foregoing example illustrates the synchronization of two smart cards, it will be appreciated that this procedure can be employed to synchronize any number of different smart cards that a user might employ to access the Internet application. Thus, for example, the user might possess a conventional smart card that is designed for use with a number of different applications, and a "clone" of that card which is limited to one of those applications, e.g. a portal or banking application. The synchronization server 42 of FIG. 3 can function to keep the information stored in all three of the user's cards, namely the conventional card, the clone card and the SIM card, consistent.

In view of the foregoing, therefore, it can be seen that the present invention provides a mechanism to establish a virtual connection to an Internet application that utilizes smart cards, by means of a telecommunications device that has a dedicated smart card. As such, the established deployment of these devices can be used to broaden the base for access to the application, and thereby overcome the limitations associated with the need to connect a conventional smart card reader to a personal computer, or the like. In a preferred embodiment of the invention, the applications support communication with both conventional ISO-compliant smart cards and other dedicated smart cards, such as SIM cards. The user has the flexibility to employ either type of card for any given session with the application. Synchronization between all of the cards that the user might employ is ensured by a synchronization server associated with application.

It will be appreciated by those of ordinary skill in the art that the present invention can be implemented in other specific forms without departing from the spirit or essential characteristics thereof. For instance, while specifically disclosed in the context of SIM cards that are utilized in GSM-compliant mobile telephones, the concepts which underlie the invention can be employed with any type of smart card that is utilized in an environment that provides a means for connecting the card to an application server. The presently disclosed embodiments are therefore considered in all respects to be illustrative and restrictive. The scope of the invention is indicated by the appended claims, rather than the foregoing description, and all changes that come within the meaning and range of equivalence thereof are intended to be embraced therein.

What is claimed is:

1. A smart card for providing a user with access to a smart card based Internet application in the absence of a conventional reader for a smart card, said smart card having a memory with information stored therein that comprises:
   a first set of information that enables a telecommunications device, for which said smart card is designed to be used, to establish a connection with a telecommunications network, and
   an applet that enables said device to conduct an Internet session with the Internet accessible application once said connection is established, and that functions as an interface to said application.

2. The apparatus of claim 1 wherein said applet is a client component of said application.

3. The apparatus of claim 1 wherein said device is a portable wireless telecommunications device.

4. The apparatus of claim 3 wherein said smart card is a subscriber identification module that authenticates a user to said network.

5. The apparatus of claim 3 wherein said applet includes an over-the-air application for transmitting information to the Internet application for use in conducting said session.

6. A system for providing users with access to smart card based Internet applications, comprising:
   a server executing at least one user application that utilizes information stored on a smart card;
   a first connection associated with said server that provides said application with access to the information stored in a first smart card by means of the Internet; and
   a second connection associated with said server that provides said application with access to a device on a telecommunications network that contains a second smart card.

7. The system of claim 6 wherein said first smart card that is accessed via the Internet is an ISO-compliant smart card.

8. The system of claim 6 wherein the second smart card in said device is a subscriber identification module.

9. The system of claim 8 wherein said device is a mobile telephone.

10. The system of claim 6 further including means for synchronizing changes made on either of said first and second smart cards during a session with the other of said smart cards during a subsequent session using said other smart card.

11. The system of claim 10 further including means associated with said server for temporarily storing changes made on one of said smart cards during a given session for download to the other of said smart cards during a subsequent session.

12. The system of claim 11 further including means associated with said server for detecting whether a given session with said application is being conducted with the first smart card or the second smart card.

13. The system of claim 12 wherein the download of said stored changes is carried out automatically upon detecting that a session is being conducted with said other smart card.

14. The system of claim 12 further including means for enabling a user to select whether the download of said stored changes is to be carried out upon detecting that a session is being conducted with said other smart card.

15. The system of claim 6 wherein said second connection includes a gateway that translates messages appropriate to said telecommunications network into commands and responses for said application, and vice versa.

16. A system for providing a user with access to a smart card based Internet application in the absence of a conventional reader for a smart card, comprising:
   a smart card containing a first set of information that enables a telecommunication device to establish a connection with a telecommunications network, and an applet stored on said smart card that enables said device to conduct an Internet session with the Internet application via said connection, and that functions as an interface to said application; and
   a gateway that establishes a virtual link between the device and the Internet application, and that translates messages exchanged between the device and the application.

17. The system of claim 16 wherein said device is a portable wireless telecommunications device.

18. The system of claim 17 wherein said smart card is a subscriber identification module that authenticates a user to said network.

19. The system of claim 17 wherein said smart card further includes an over-the-air application for transmitting information to the Internet application for use in conducting said session.

20. A method for providing a user with access to a smart card based Internet application in the absence of a conventional reader for a smart card, comprising the following steps:
   storing a first set of information on a smart card that enables a telecommunications device, with which said smart card is used, to establish a connection with a telecommunications network; and
   storing an applet on said smart card that enables said device to conduct an Internet session with the Internet application once said connection is established, and that functions as an interface to said application.

21. The method of claim 20 wherein said applet is a client component of said application.

22. The method of claim 21 wherein said device is a portable wireless telecommunications device.

23. The method of claim 22 wherein said smart card is a subscriber identification module that authenticates a user to said network.

24. The method of claim 22 further including the step of storing on said smart card an over-the-air application for transmitting information to the Internet application for use in conducting said session.

25. A method for providing users with access to smart card based Internet applications, comprising:
- executing on a server at least one user application that utilizes information stored on a smart card;
- establishing a first session with said server by means of the Internet to provide said application with access to the information stored in a first smart card; and
- establishing a second session with said server by means of a telecommunications network to provide said application with access to a device on said telecommunications network that contains a second smart card.

26. The method of claim 25 wherein said first smart card that is accessed via the Internet is an ISO-compliant smart card.

27. The method of claim 25 wherein the second smart card in said device is a subscriber identification module.

28. The method of claim 27 wherein said device is a mobile telephone.

29. The method of claim 25 further including the step of synchronizing changes made on either of said first and second smart cards during a session with the other of said smart cards during a subsequent session using said other smart card.

30. The method of claim 29 further including the step of temporarily storing changes made on one of said smart cards during a given session for download to the other of said smart cards during a subsequent session.

31. The method of claim 30 further including the step of detecting whether a given session with said application is being conducted with the first smart card or the second smart card.

32. The method of claim 31 wherein the download of said stored changes is carried out automatically upon detecting that a session is being conducted with said other smart card.

33. The method of claim 31 further including the step of enabling a user to select whether the download of said stored changes is to be carried out, in response to detecting that a session is being conducted with said other smart card.

* * * * *